(12) United States Patent
Yoda et al.

(10) Patent No.: US 6,643,944 B2
(45) Date of Patent: Nov. 11, 2003

(54) TOUCH SIGNAL PROBE AND SIGNAL PROCESSING APPARATUS AND SIGNAL PROCESSING METHOD OF THE SAME

(75) Inventors: Yukiji Yoda, Kawasaki (JP); Tomoyuki Miyazaki, Kawasaki (JP); Yutaka Nishitsuji, Kawasaki (JP); Yoshikazu Kobayashi, Kawasaki (JP); Keiji Akagi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/158,247

(22) Filed: May 30, 2002

(65) Prior Publication Data

US 2002/0180470 A1 Dec. 5, 2002

(30) Foreign Application Priority Data

May 31, 2001 (JP) ........................................ 2001-165729

(51) Int. Cl.$^7$ ................................................ G01B 7/00
(52) U.S. Cl. ........................................... 33/558; 33/561
(58) Field of Search .................................... 33/558, 561

(56) References Cited

U.S. PATENT DOCUMENTS 5,012,591 A  * 5/1991 Asakawa .................... 33/832
RE37,030 E  * 1/2001 Lloyd et al. ................. 33/559
6,516,529 B2 * 2/2003 Hidaka et al. ............... 33/561

FOREIGN PATENT DOCUMENTS

JP      10-096618      4/1998
JP      10-288502     10/1998

* cited by examiner

*Primary Examiner*—Christopher W. Fulton
(74) *Attorney, Agent, or Firm*—Rankin, Hill, Porter & Clark LLP

(57) ABSTRACT

A touch signal probe comprises a fixed member, a movable member, a bias means, a drive member, a deformation touch signal processing circuit, a contact touch signal processing circuit, and a latch circuit. A stylus is attached to the movable member. The drive member relatively drives reseat position elements respectively placed on the fixed member and the movable member. The bias means restores the movable member to a still position. The deformation touch signal processing circuit generates a deformation touch signal. The contact touch signal processing circuit uses the reseat position elements as make-and-break electric contacts to generate a contact touch signal. The latch circuit inputs coordinate values every instant at which the deformation touch signal is output and stores the coordinate values as the most recent coordinate values for update, and when the contact touch signal is output, outputs the most recent coordinate values as detected coordinate values.

19 Claims, 9 Drawing Sheets

TOUCH SIGNAL PROBE AND SIGNAL PROCESSING APPARATUS AND SIGNAL PROCESSING METHOD OF THE SAME

BACKGROUND OF THE INVENTION

1. Field of the Invention

The present invention relates to a touch signal probe and a signal processing apparatus and a signal processing method of the touch signal probe, the touch signal probe being attached to a surface texture measuring machine such as a form measuring instrument or a CMM (Coordinate Measuring Machine). More particularly, the present invention relates to a touch signal probe, and a signal processing apparatus and a signal processing method of the touch signal probe which comprises a fixed member, a movable member, a reseat position system for allowing displacement of the movable member relative to the fixed member when an external force acts on the movable member and precisely restoring the movable member to a still position when the force acting on the movable member disappears, and deformation detection elements attached to a stylus.

2. Description of the Related Art

With the CMM, a touch signal probe is widely used for measuring a surface texture of a work by detecting contact between the probe and the work. With the CMM using such a touch signal probe, a contact element of the probe that can make a relative move in a three-dimensional direction is brought into contact with a work placed on a stage. The coordinate values of axes (axes in the three-dimensional direction) of the contact element are read with the instant at which the contact element comes in contact with the work as an electric trigger. Then, the dimensions and the shape of the work are found based on the coordinate values. Thus, the contact state between the probe and the work can be used as an electric touch signal to detect the position.

FIG. 8 shows a touch signal probe in a related art. In FIG. 8, the touch signal probe in the related art comprises a stylus 1, a movable member 2, posts 3, a housing 4, a fixed member 5, hardballs (steel balls) 6, bias means 7, and a contact element 8. The stylus 1 is fixed to the movable member 2. The stylus 1 is provided at the tip with the spherical contact element 8. In an outer circumference face of the movable member 2, three posts 3 are provided radially with a 120-degree spacing within a plane at the right angle to the axis of the stylus 1 and with the axis of the stylus 1 as the center. On the other hand, three pairs of hard balls 6 are fixed to the fixed member 5 at the positions corresponding to the posts 3 of the movable member 2. The posts 3 and the hard balls 6 form reseat position elements for uniquely defining the relative position between the fixed member 5 and the movable member 2.

In such a configuration, the movable member 2 is pressed against the fixed member 5 by the action of a bias force F of a bias means 7 and is forcibly brought into contact with the fixed member 5 through reseat position members. The movable member 2 is standing still at six contact points with the fixed member 5 in the state that the press force from the work is applied to the contact element 8 provided at the tip of the stylus 1. This means that each post 3 of the movable member 2 is standing still at two contact points with two hard balls 6 (at six contact points as a whole). Therefore, this is called a six-point contact type reseat position system. The six contact points are connected in series electrically as switch. The contact element 8 comes in contact with the work W and the movable member 2 performs relief operation, so that an out-of-contact condition occurs at any of the six contact points and thus a touch signal can be produced.

In such a six-point contact type reseat position system, the restoration position after the movable member 2 performs relief operation is defined uniquely. That is, assuming that the stylus 1 is displaced in each contact point direction in parallel with the axial direction of the still position of the stylus 1 while the stylus 1 is held in contact with a movable member side reseat position member (posts 3) and a fixed member side reseat position member (hard balls 6), each locus drawn by the tip of the stylus 1 crosses the axis at the still position of the stylus 1. According to such a configuration, at the restoration operation time after the movable member 2 performs relief operation by the press force from the work W, the contact with each contact point is only recovered by the bias force F and the stylus 1 is restored to the unique still position and the still position of the stylus 1 can be held constant.

With the six-point contact type reseat position system, the position of the movable member relative to the fixed member is determined uniquely by contact at six points and thus vibration-resistant rigidity in a reseat position state is high. If press force is applied from any direction, the six-point contact type reseat position system has high restoration accuracy when viewed in comparatively rough order in 10-$\mu$m units, for example.

The touch signal probe uses an out-of-contact condition of each contact point in the reseat position system as a touch signal. A touch signal is not output at the instant at which the contact element 8 actually comes in contact with the work W. Signal output is delayed as much as deformation (or distortion) of the stylus 1. If the stylus 1 is long, the tendency becomes noticeable, leading to a bottleneck in high accuracy of measurement.

To deal with this problem, a touch signal probe for detecting deformation of a stylus and producing a touch signal, as shown in FIGS. 9A and 9B is proposed (Japanese Patent Unexamined Publication No. Hei. 10-288502).

In FIG. 9A, a stylus 22 has, at one end, a contact element 24 for coming in contact with a work. Four piezoelectric elements 121 to 124 are attached to a roughly columnar part at an opposite end of the stylus 22.

Each of piezoelectric element support parts 101C and 101D is a flange-like rectangular parallelepiped which is square in cross section orthogonal to the stylus axis. The piezoelectric elements 121 to 124 are fixedly secured to full sides of both rectangular parallelepipeds with an adhesive, etc., so as straddle both rectangular parallelepipeds. According to such a structure, the piezoelectric elements are used as deformation detection elements of the stylus to detect deformation (distortion) of the stylus 22 when the contact element 24 comes in contact with a work W for producing a touch signal.

The detection accuracy of the touch signal probe comprising such a deformation detection type stylus can be 1 $\mu$m or higher performance.

Then, if an attempt is made to attach the deformation detection type stylus 22 to the movable member 2 in place of the stylus 1 and use the above-described six-point contact type reseat position system in combination, the reseat position accuracy of the reseat position system becomes insufficient. That is, when the movable member performs relief operation, the contact element of the movable member is pushed into the work and causes relative displacement to the fixed member.

With the six-point contact type reseat position system, from the viewpoint of higher accuracy, for example, 1 μm or less, at the time of the restoration operation after contact, the relative displacement between the movable member and the fixed member causes an error in restoration position (reseat position shift error) to occur.

That is, if the contact element 8 comes in contact with the work W in the orthogonal direction to the axis of the stylus 1 and is pushed into the work W, the stylus 1 and the movable member 2 are inclined and the hard balls 6 and the post 3 are brought out of contact. At this time, drag almost in opposite directions occurs between the movable member 2 and the fixed member and a slight shift in the orthogonal direction to the axis of the stylus occurs in the movable member 2. After this, if the work W and the contact element 8 are brought out of contact with each other, the movable member 2 performs restoration operation by the bias force F, but a restoration position shift (reseat position shift) occurs between the movable member 2 and the stylus 1 because of the above-mentioned shift. The restoration position shift directly affects the measurement accuracy of the probe.

As a reseat position system for correcting such a restoration position shift after the restoration operation, a reseat position system shown in FIG. 10 is proposed (Japanese Patent Unexamined Publication No. Hei. 10-96618). With the reseat position system, piezoelectric elements, etc., are used to manage the direction of the frictional force acting on the contact point between a movable member and a fixed member of the reseat position system, thereby correcting a reseat position shift.

The reseat position system comprises a fixed member 11, a movable member 21, and bias force generation means (not shown). The bias force generation means allows displacement of the movable member 21 relative to the fixed member 11 when an external force acts on the movable member 21 and restores the movable member 21 to a still position when the force acting on the movable member 21 disappears. A stylus 22 having a spherical contact element 24 for coming in contact with a work is provided to the movable member 21. The movable member 21 has, on the outer circumference face, three posts 23 for coming in contact with the fixed member 11 radially with a 120-degree spacing in the orthogonal direction to the axis of the stylus 22.

The fixed member 11 is fixed at the center to a probe housing (not shown). The fixed member 11 has three arms 12 extending radially with a 120-degree spacing with the axis of the stylus 22 as the center. Two hard balls 13 are placed on the top face of the tip of each arm 12. In each arm 12, a piezoelectric element 14 as a displacement generation mechanism is placed expandably in the center part of the fixed member 11 inner from the hard balls 13 roughly along the radial direction relative to the axis of the stylus 22. When a voltage is applied to each piezoelectric element 14, the piezoelectric elements 14 are displaced in synchronization with each other and the hard balls 13 are displaced in the roughly radial direction with the axis of the stylus 22 as the center. The term "displacement" mentioned here is static displacement and displacement is given gradually by the piezoelectric element. As they are displaced, the directions of the frictional forces at the contact points between the posts 23 and the hard balls 13 are made uniform and the reseat position is adjusted so as to restore to the still position by the bias force.

However, the deformation detection type stylus, which has extremely high detection accuracy, also reacts with various types of noise and outputs a touch signal; the application of the deformation detection type stylus is extremely limited.

That is, to use the deformation detection type stylus and a measuring machine in combination, various vibrations occurring in the measuring machine itself become noise sources. For example, if move operation of each axis of a CMM is performed, a comparatively large vibration occurs in the vicinity of the resonance frequency of each axis structure. An air bearing often used with a precision measuring machine may produce a vibration depending on the structure of an air pad. With motor driving, the carrier frequency of a DC motor undergoing Pulse Width Modulation (PWM) can also become a noise source. Further, noise may also be produced by conversation in a loud voice or walking of a human being in the proximity of the touch signal probe.

The reseat position accuracy of the improved reseat position system is not necessarily sufficient for using the reseat position system and the deformation detection type stylus having extremely high detection accuracy in combination.

SUMMARY OF THE INVENTION

It is an object of the invention to provide a touch signal probe, and a signal processing apparatus and a signal processing method the touch signal probe for generating a touch signal reliably with high accuracy without receiving the effect of a noise source.

In order to achieve the above-mentioned object, according to the invention, there is provided a signal processing apparatus of a touch signal probe used for a machine capable of measuring coordinate values of the touch signal probe, the touch signal probe having a fixed member, a movable member to which a stylus comprising a contact element and a deformation detection element is attached, a fixed member side reseat position element being placed on the fixed member, a movable member side reseat position element being placed on the movable member for coming in contact with the fixed member side reseat position element, and a bias member for allowing displacement of the movable member relative to the fixed member when an external force acts on the stylus and restoring the movable member to a still position by a bias force when the external force acting on the stylus disappears, the signal processing apparatus comprising:

a drive circuit for outputting a drive signal for causing the movable member side reseat position element to make a relative move to the fixed member side reseat position element;

a deformation touch signal processing circuit for generating a deformation touch signal from the deformation detection element;

a contact touch signal processing circuit using the fixed member side and movable member side reseat position elements as make-and-break electric contacts to generate a contact touch signal from the make-and-break electric contacts; and a latch circuit for inputting the coordinate values every instant at which the deformation touch signal is output and storing the coordinate values as the most recent coordinate values for update and when the contact touch signal is output, outputting the most recent coordinate values as detected coordinate values.

In the above-mentioned processing apparatus, it is preferable that the deformation touch signal processing circuit includes a high-pass filter circuit and a low-pass filter circuit. The high-pass filter circuit may have a cutoff frequency ranging from 3 kHz to 10 kHz. The low-pass filter circuit may have a cutoff frequency ranging from 50 kHz to 200 kHz. The deformation touch signal processing circuit may include an amplification circuit wherein gain switching is possible. The he deformation touch signal processing circuit may include a comparison circuit.

Further in the above-mentioned processing apparatus, it is preferable that the deformation touch signal processing circuit includes a monostable multivibrator started by output of the comparison circuit and converts a high-frequency signal output from the deformation detection element by the monostable multivibrator into a digital low-frequency signal. The amplification circuit may switch the gain by a gain signal provided from the machine. The comparison circuit may switch a threshold level by a threshold level signal provided from the machine. The drive circuit may cause the movable member side reseat position element to make a relative move to the fixed member side reseat position element on the basis of a reseat position correcting signal provided from the machine.

In order to achieve the above-mentioned object of the invention, there is also provided a touch signal probe comprising:

a fixed member;

a movable member to which a stylus comprising a contact element and a deformation detection element is attached;

a fixed member side reseat position element being placed on the fixed member;

a movable member side reseat position element being placed on the movable member for coming in contact with the fixed member side reseat position element;

A bias member for allowing displacement of the movable member relative to the fixed member when an external force acts on the stylus and restoring the movable member to a still position by a bias force when the external force acting on the stylus disappears:

a drive member for causing the movable member side reseat position element to make a relative move to the fixed member side reseat position element;

a deformation touch signal processing circuit for generating a deformation touch signal from the deformation detection element;

a contact touch signal processing circuit using the fixed member side and movable member side reseat position elements as make-and-break electric contacts to generate a contact touch signal from the make-and-break electric contacts; and a signal processing unit having a latch circuit for inputting coordinate values of the touch signal probe every instant at which the deformation touch signal is output and storing the coordinate values as the most recent coordinate values for update and when the contact touch signal is output, outputting the most recent coordinate values as detected coordinate values.

In the above-mentioned touch signal probe, it is preferable that the movable member side reseat position element comes in contact with the fixed member side reseat position element at each contact point with two at three apart places from each other. The drive member may be a contact point displacement member for changing the contact point on the fixed member side and the contact point on the movable member side relatively at least a predetermined distance. The drive member may cause relative vibration only for a given time while holding contact between the contact points on the fixed member side and the movable member side after the external force acting on the movable member disappears.

Further, in the above-mentioned touch signal probe, it is preferable that a diameter of the bias area containing a point biasing the movable member by the bias member is 20% or less of a diameter of a kinematic circle containing the contact points on the circumference with the axis of the stylus as the center and is roughly equal to or more than a pinpoint. A center of the bias area roughly may match a barycentric position of the movable member. A center of the bias area roughly may match a center of the kinematic circle. The bias member may include a helical spring and a length of the helical spring is about one time or more and 2.5 times or less a diameter of the helical spring.

Moreover, in order to achieve the above-mentioned object of the invention, there is provided a signal processing method of a touch signal probe for use with a machine capable of measuring coordinate values of the touch signal probe, the touch signal probe having a fixed member, a movable member to which a stylus comprising a contact element and a deformation detection element is attached, a fixed member side reseat position element being placed on the fixed member, and a movable member side reseat position element being placed on the movable member for coming in contact with the fixed member side reseat position element, a drive member for causing the movable member side reseat position element to make a relative move to the fixed member side reseat position element, an bias member for allowing displacement of the movable member relative to the fixed member when an external force acts on the stylus and restoring the movable member to a still position by a bias force when the external force acting on the stylus disappears, a deformation touch signal processing circuit including an operation circuit for enabling an operation condition to be switched, for generating a deformation touch signal from the deformation detection element, and a contact touch signal processing circuit using the fixed member side and movable member side reseat position elements as make-and-break electric contacts to generate a contact touch signal from the make-and-break electric contacts, the signal processing method comprising:

positioning the touch signal probe before a measurement point of a work;

driving the drive member for making a reseat position correction;

switching the operation condition of the operational circuit for enhancing sensitivity;

feeding the touch signal probe into the measurement point for measuring;

when the deformation touch signal is input, inputting the coordinate values and storing the coordinate values as the most recent coordinate values for update;

when the contact touch signal is input, outputting the most recent coordinate values as detected coordinate values; and switching the operation condition of the operational circuit for lowering the sensitivity.

DETAILED DESCRIPTION OF THE INVENTION

Referring now to the accompanying drawings, there are shown preferred embodiments of the invention.

Figure 1:
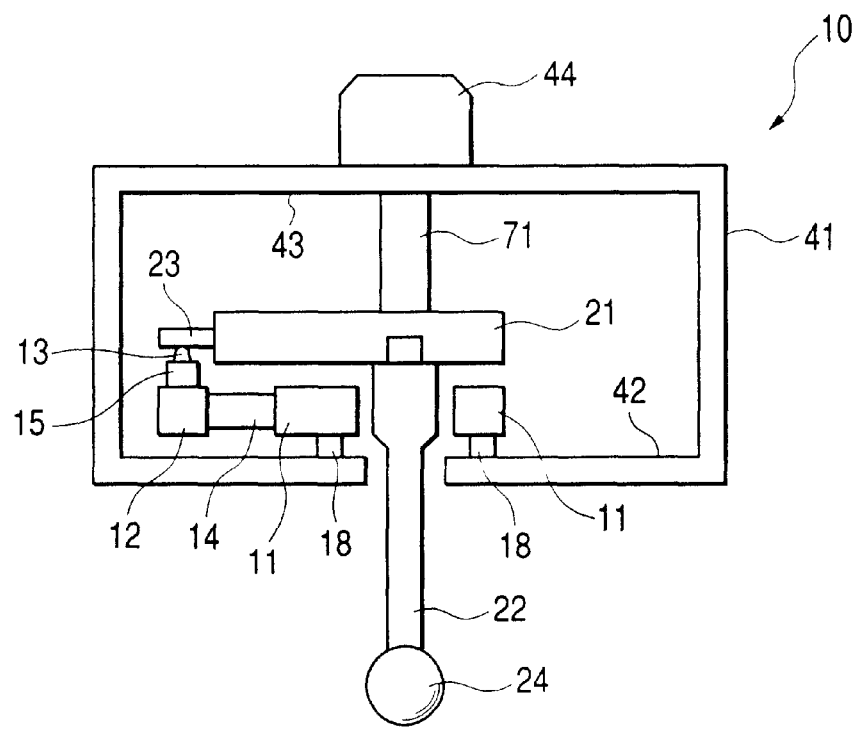
FIG. 1 is a sectional view of a touch signal probe according to the invention.
Figure 9A:
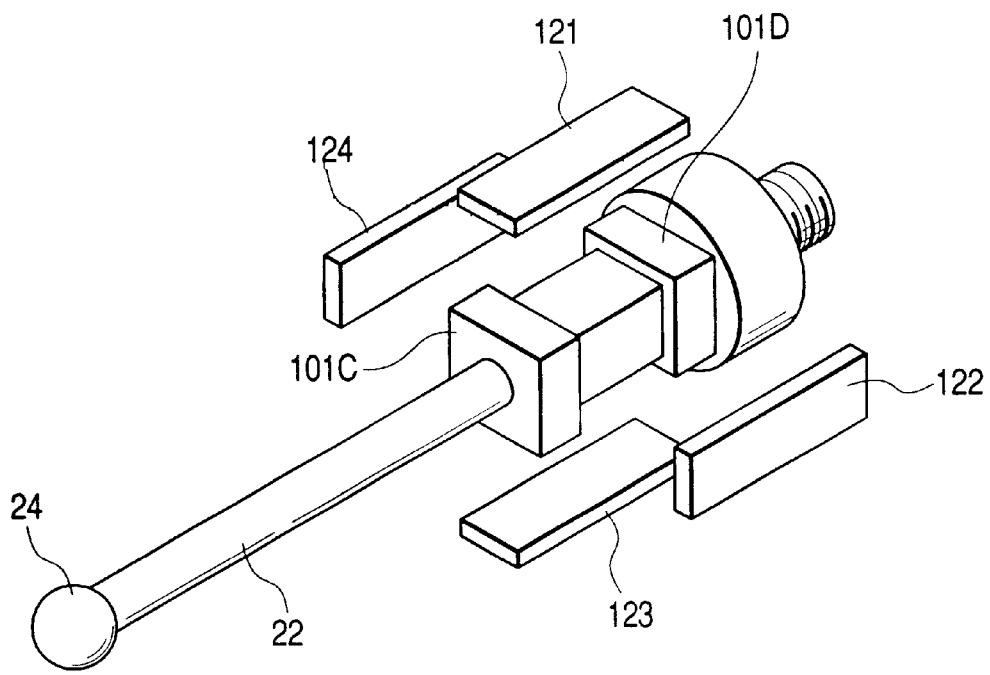
FIGS. 9A and 9B are a drawing to show the structure of a stylus in the related art.
Figure 9B:
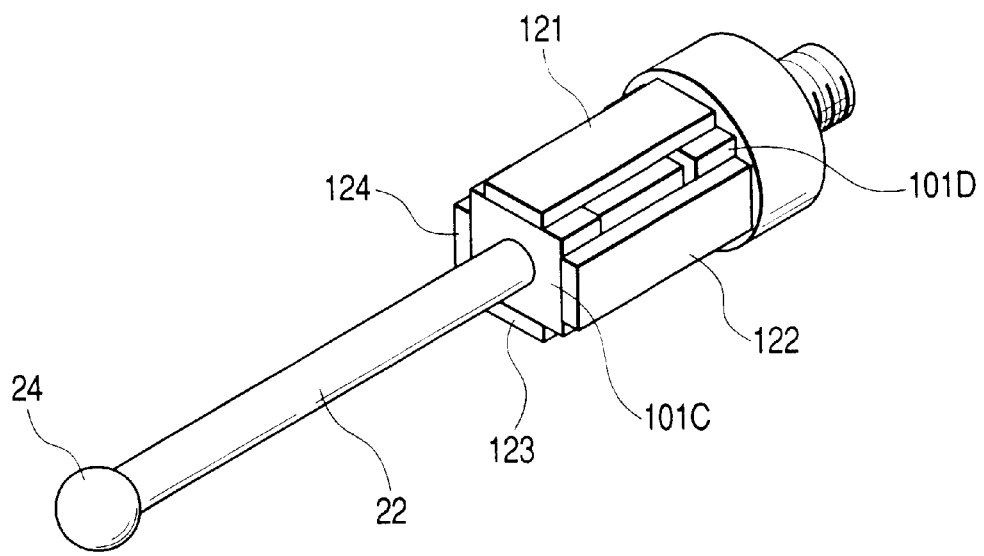
Figure 10:
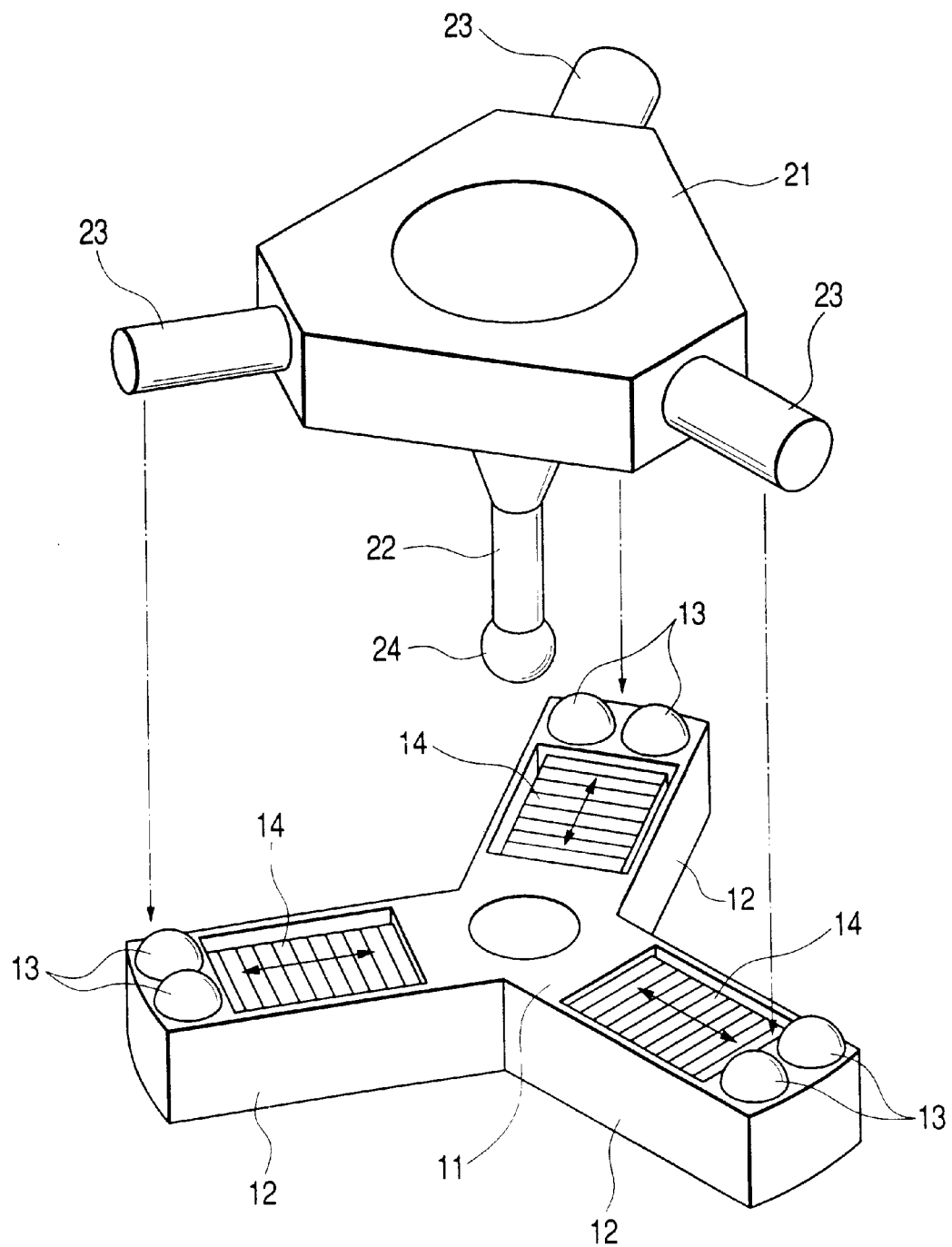
FIG. 10 is a drawing to show the structure of a reseat position system in the related art.

FIG. 1 is a sectional view of a touch signal probe 10 according to the invention. Members identical with those previously described with reference to FIGS. 9A and 9B and FIG. 10 are denoted by the same reference numerals in FIG. 1 and therefore will not be discussed again in detail. In FIG. 1, a fixed member 11 is fixed to a bottom 42 of a housing 41 through a fixed member stand 18. Each arm 12 (FIG. 10) of the fixed member 11 is formed of beryllium copper of an elastic material. A piezoelectric element 14 is buried in the arm 12. A hard ball support part 15 of an electric insulator undergoing anodic oxide coating (ALMITE®) is buried in the tip of the arm 12 in one piece.

Figure 2:
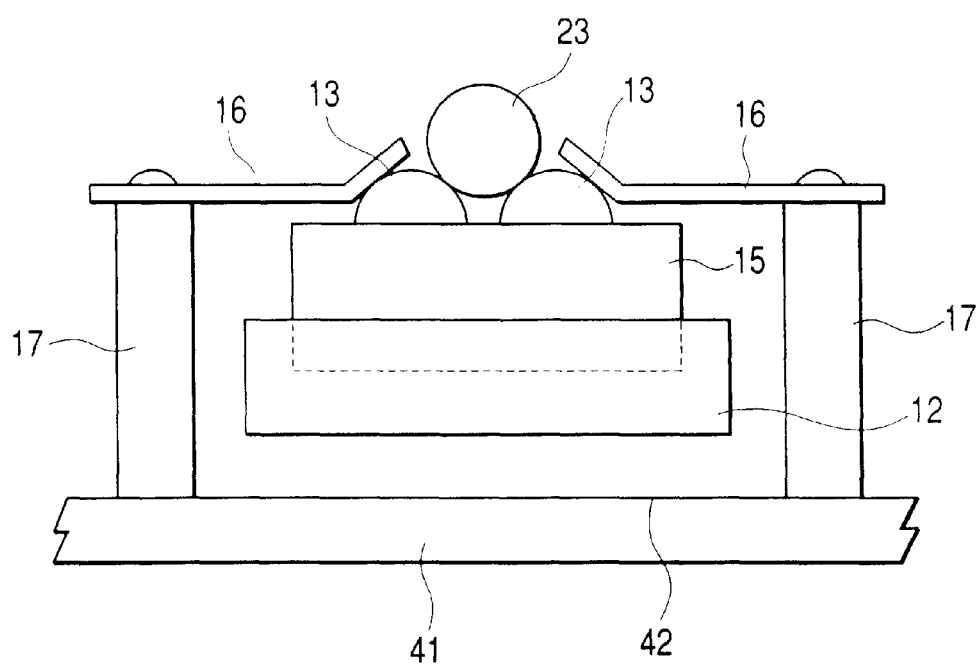
FIG. 2 is a partial view of the touch signal probe according to the invention.

A displacement drive voltage is applied from a drive source (circuit 191 in FIG. 3) to the piezoelectric element 14. Consequently, with the applied voltage, the piezoelectric element 14 produces displacement motion of about 0.5-$\mu$m width in an orthogonal direction to the axis of a stylus 22. Thus, the arm 12 is formed of beryllium copper of an elastic material to prevent heating and degradation caused by metal fatigue for prolonging the life. Two recesses are made in the upper end face of the hard ball support part 15. About a lower half of a hard ball (steel ball) 13 is buried in each recess. FIG. 2 is a view of the portion of the hard balls 13 in FIG. 1 from the left of the drawing. Each hard ball 13 and a post 23 form an electric contact and electric connection to the hard ball 13 is made by pressing an elastic thin piece 16. The elastic thin piece 16 is fixed to the bottom 42 of the housing 41 through a thin piece stand 17 of an electric insulator. The material of the elastic thin piece 16 is phosphor bronze for a spring.

A bias means 71 of a press coil spring is placed between a ceiling 43 of the housing 41 and a movable member 21. The movable member 21 is pressed against the hard balls 13 through the post 23 by the bias means 71. The bias means 71 uses a helical compression spring. Optimally the coil diameter is set to 3 mm, the length is set to 6.5 mm, and the bias force is set to 300 g. A kinematic circle containing six points at which the posts 23 and the hard balls 13 come in contact with each other with the stylus axis as the center has a diameter of 28 mm. In contrast, to use a helical compression spring having a length of 6.5 mm, a bias force of 300 g, and a diameter of 11 mm, for example, the restoration error in the kinematic circumferential direction becomes extremely large. To use a helical compression spring having a diameter of 6 mm, the error is a little lessened, but the restoration accuracy is insufficient. To use a helical compression spring having a diameter of 2 mm, the restoration accuracy is good.

The possible reason is that the smaller the coil diameter, the smaller the rotation moment occurring with compression of the helical spring.

In the point of the length relative to the coil diameter of the helical compression spring, when the coil diameter is 2 mm and the length is 6.5 mm, the bias direction is not necessarily stabilized and the restoration error becomes large in some cases. Therefore, to use a helical spring as the bias means 71, preferably the coil diameter is set in the range of 5% to 20% of the kinematic circle formed by the contact points between the hard balls 13 and the posts 23 of the reseat position points. Further, preferably the length of the helical spring is up to 2.5 times the coil diameter of the helical spring. On the other hand, if the ratio falls below one, it becomes difficult to provide a sufficient bias force. That is, if an attempt is made to provide a sufficient bias force, the rotation moment accompanying compression of the helical spring is also increased and the reseat position accuracy is degraded.

The shaft of the helical spring is matched with the barycentric point of the movable member 21 for biasing. Further, preferably the barycentric point is matched with the center of the kinematic circuit. Placed on the top of the housing 41 is a connector 44 for fixing the touch signal probe 10 to a Z axis spindle, etc., of the CMM and transmitting and receiving an electric signal. The stylus 22 comprising a contact element 24 at one end is formed at an opposite end with a male screw. The male screw is screwed into a female screw placed at the center of the movable member 21 for fixing the stylus 22 and the movable 21 in one piece. As shown in FIG. 1, the stylus 22 is attached to a position piercing a round hole made in the center of the fixed member 11.

The detailed structure of the stylus 22 is the same as that previously described with reference to FIGS. 9A and 9B. In FIG. 9A, the stylus 22 has a contact element 24 for coming in contact with a work and four piezoelectric elements 121 to 124 attached to a roughly columnar part at an opposite end. Each of piezoelectric element support parts 101C and 101D is a flange-like rectangular parallelepiped which is square in cross section orthogonal to the stylus axis. The piezoelectric elements 121 to 124 are fixedly secured to full sides of both rectangular parallelepipeds with an adhesive, etc., so as straddle both rectangular parallelepipeds. The piezoelectric elements 121 and 123 have the surface and back relationship with the axis of the stylus 22 between, and the piezoelectric elements 122 and 124 have the surface and back relationship at the positions adjacent to the piezoelectric elements 121 and 123.

As shown in FIG. 9B, each of the piezoelectric elements 121 to 124 is shaped like a flat rectangle parallel with the stylus axis in the length direction of the piezoelectric element.

Now, assuming that the contact element 24 and the work W come in contact with each other in a plane orthogonal to the stylus axis, output of the piezoelectric element 121 reaches maximum value V0 at time T0 determined by the natural frequency, etc., of the stylus 22. The magnitude of the maximum value V0 varies depending on the angle between the attachment azimuth of the piezoelectric element 121 and the azimuth of the contact element 24 coming in contact with the work W, namely, angle $\theta$ around the axis. The output of the piezoelectric element 121 changes like a sine wave in 360-degree cycles in response to the angle $\theta$. The output maximum value V0 reaches maximum value Vmax when the work W and the contact element 24 come in contact with each other at the angle (θ=0) at which the piezoelectric element 121 easily undergoes bend deformation.

Figure 3:
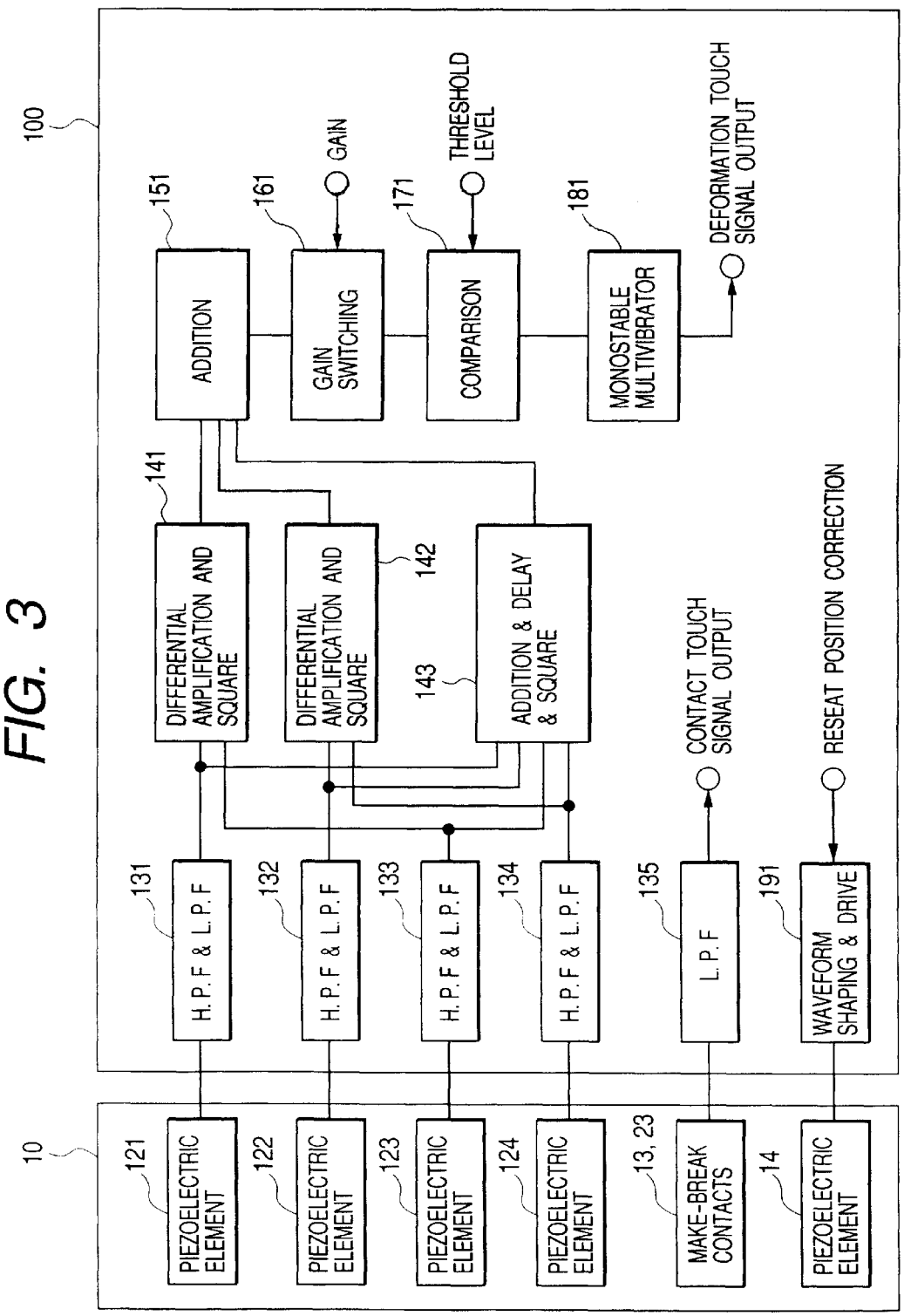
FIG. 3 is a block diagram of a touch signal processing section according to the invention.

FIG. 3 is a block diagram of a touch signal processing section for generating a contact signal based on output from the four piezoelectric elements 121 to 124. In FIG. 3, signals output from the piezoelectric elements 121 to 124 are amplified by amplification circuits 131 to 134 each having both a high-pass filter (HPF) function and a low-pass filter (LPF) function to generate V1 to V4. Then, difference V13 between the signals V1 and V3 output from the piezoelectric elements 121 and 123 having the surface and back relationship is differentially amplified by a circuit 141, and then squared. Difference V24 between the signals V2 and V4 output from the piezoelectric elements 122 and 124 having the surface and back relationship is differentially amplified by a circuit 142 and then is squared.

Each of the piezoelectric elements 121 to 124 has very high sensitivity and thus has the drawback of also reacting sensitively with various types of noise. For example, the resonance frequency of each axis structure of the CMM is several hundred Hz. An air bearing often used with a precision measuring machine produces a vibration of several kHz depending on the structure of an air pad. The carrier frequency of a DC motor undergoing pulse width modulation is also often about several kHz (for example, 3 kHz). As for voice, usually, power of up to about 3 kHz is strong. Therefore, preferably the cutoff frequency of the high-pass filter is set to several kHz (in the neighborhood of 5 kHz). Since inductive noise produced by electromagnetic induction, etc., generally has a very high frequency component, preferably the cutoff frequency of the low-pass filter is set in the neighborhood of 100 kHz for shutting off the noise component. Here, the high-pass filter and the low-pass filter are used in combination, but a band-pass filter may be used, of course.

Further, the amplified signals V1 to V4 output from the piezoelectric elements 121 to 124 are added together by a circuit 143 to find sum V1234 and then the sum V1234 is delayed for a given time and is squared. The phases of the output signals from the piezoelectric elements 121 and 123 (122 and 124) different in attachment angle (180 degrees) with the stylus axis as the center differ 180 degrees. By calculating the difference V13 (V24) between the output signals of the piezoelectric elements 121 and 123 (122 and 124) and squaring the difference, it is possible to constantly extract the maximum value of the bend distortion component acting on the stylus axis independently of the angle θ. By adding the output signals of the four piezoelectric elements 121 to 124 to find the sum 1234, it is possible to remove the bend distortion component acting on the stylus axis and extract the longitudinal distortion component acting in the stylus axis direction. In the embodiment, however, to extract the longitudinal distortion component, the mode is not limited to finding the sum of the output signals of all the piezoelectric elements 121 to 124. The sum of the output signals from the two piezoelectric elements 121 and 123 or 122 and 124 having the surface and back relationship may be calculated. The V1234 is a signal representing the longitudinal distortion component extracted by removing the bend distortion component and thus reaches the maximum value when the contact element 24 comes in contact with the work W from the stylus axis direction. However, generally, the longitudinal rigidity is higher than bend rigidity and thus V1234 is earlier than V13 (V24). Therefore, V1234 is delayed in the circuit 143 and then is squared.

The signals generated in the circuits 141 and 142 and the signal generated in the circuit 143 are added and combined in a circuit 151. Then the resultant signal is input to a gain switch circuit 161. Noise becomes large because of high-speed move in high-speed positioning operation for measurement as compared with low-speed feed operation during measurement. Thus, the gain switch is to lower the gain for preventing erroneous measurement caused by various types of noise. Therefore, a gain signal is input to the circuit 161 for switching between high and low gains. Output of the gain switch circuit 161 is compared with an externally output threshold level in the comparison circuit 171 and only if the output exceeds the threshold level, a monostable multivibrator is started and a deformation touch signal is output. Each of the signals output from the piezoelectric elements 121 to 124 generally is a high-frequency signal produced by contract between the work W and the contact element 24. Since only the first rising edge of the signal needs to be caught to produce a touch signal, high-frequency impulse signal is converted into a digital signal of a given width (about 100 ms) by the monostable multivibrator.

Seat points formed by a reseat position system (or contact points between the posts 23 and hardballs 13) are make-and-break contacts and noise is removed through a low-pass filter of a circuit 135 and then a contact touch signal is output. In usual measurement, the probe 10 is brought into contact with (or is collided against) the work W at measurement speed of about 3 mm/s to 5 mm/s to provide a deformation touch signal. The stylus 22 of the probe 10 is displaced relative to the work W due to the contact between the probe 10 and work W, and the make-and-break contacts of the reseat position system are broken. At the above-mentioned measurement speed, a delay of about 15 ms to 9 ms occurs until the contact touch signal is output after the deformation touch signal is output. However, the delay time is applied when the stylus 22 has a length of 20 mm; if the stylus is longer, the delay time is also increased. The time width of the monostable multivibrator is set to a time width larger than the delay time and is set to a time width for making it possible to AND the deformation touch signal and the contact touch signal as required.

When a reseat position correction signal is input to a circuit 191, a displacement drive voltage for slowly displacing the reseat position system on the fixed member side is generated and is supplied to three piezoelectric elements 14 at the same time for giving relative displacement to the contact point of the reseat position system. The touch signal probe incorporating the signal processing circuitry or the signal processing method of the invention is connected to the lower end of a Z axis spindle of the CMM for use, for example. An outline of the structure of the CMM is not shown; for example, the CMM comprises the following structure. The CMM comprises a stage, columns, a Y axis bridge, an X axis slider and Z axis spindle. The stage places a work W thereon. The columns are placed upright at left and right ends of the stage. The Y axis bridge bridges the tops of the columns and has a gantry-structure back and forth movable relative to the stage. The X axis slider is movable from side to side along the bridging portion of the Y axis bridge. The Z axis spindle is installed in the X axis slider and movable up and down. The move directions of the X axis, the Y axis, and the Z axis are orthogonal to each other. Therefore, the touch signal probe connected to the lower end of the Z axis spindle can be positioned at any desired speed to any desired position relative to the work W by driving each of the X, Y, and Z axes (by driving the X slider, the Y bridge, and the Z axis spindle).

Figure 4:
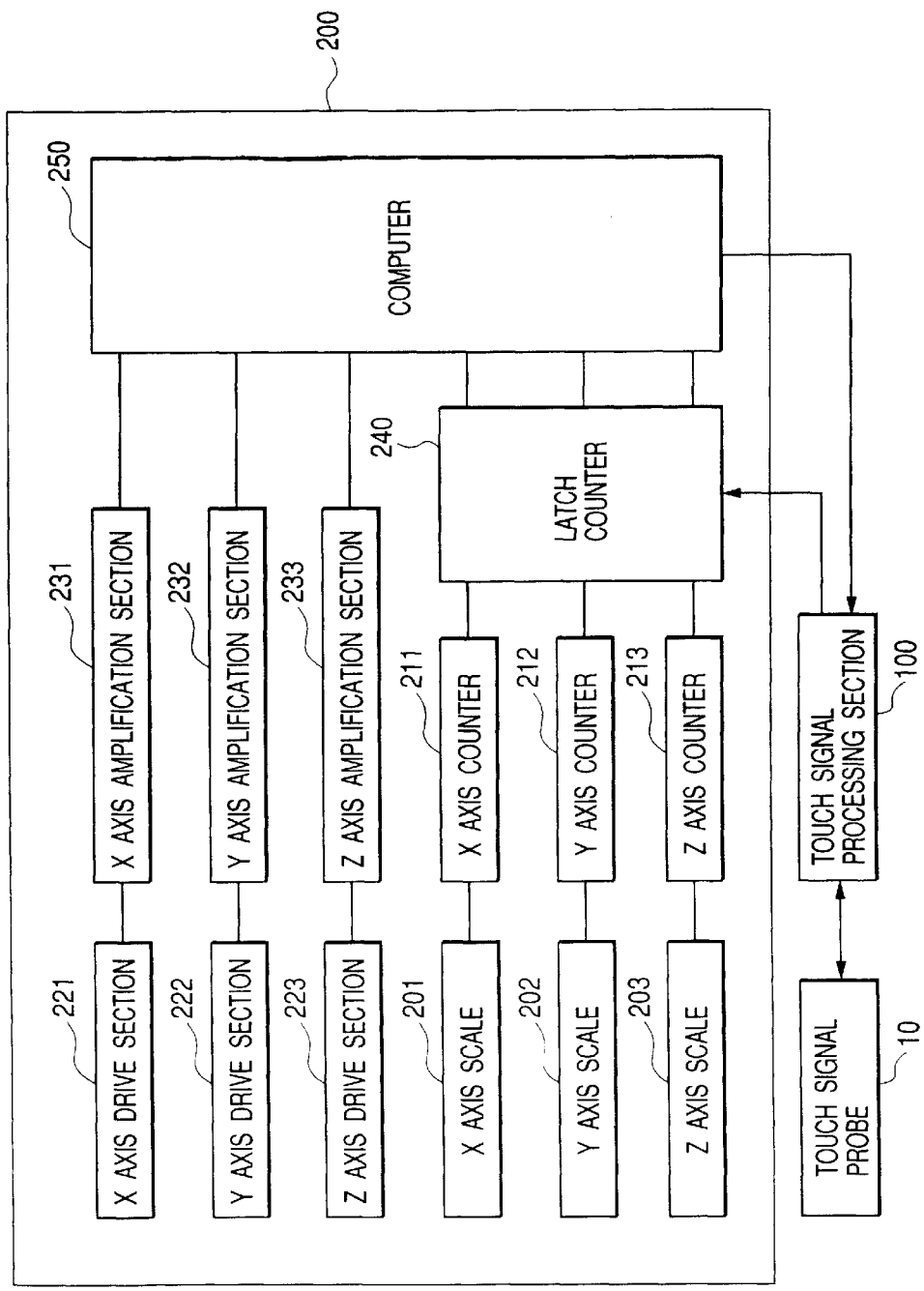
FIG. 4 is a block diagram of a CMM (Coordinate Measuring Machine) using the touch signal probe according to the invention.

FIG. 4 is a block diagram of the CMM 200.

X, Y, and Z axis drive sections 221 to 223 are each made up of a drive guide and a drive motor for driving orthogonal three axes (X, Y, and Z axes). X, Y, and Z axis amplification sections 231 to 233 perform power amplification for the motors based on a drive signal output from a computer 250. X, Y, and Z axis scales 201 to 203 perform position detection of displacement of the orthogonal three axes (X, Y, and Z axes) (that is, the X slider, the Y bridge, and the Z axis spindle), and X, Y, and Z axis counters 211 to 213 perform integration of the position detection results and output the current position coordinate values of the axes. A circuit 240 inputs and temporarily stores (latches) outputs of the X, Y, and Z axis counters 211 to 213 and outputs to the computer 250 as required.

An electric signal of the touch signal probe 10 is connected to the touch signal processing section 100 and a deformation touch signal and a contact touch signal output from the touch signal processing section 100 are input to the circuit 240. The latch processing circuit 240 temporarily stores outputs of the X, Y, and Z axis counters 211 to 213 every given time (for example, every 10 ms) and outputs the temporality stored data to the computer 250. In addition, the latch processing circuit 240 temporarily stores outputs of the X, Y, and Z axis counters 211 to 213 (current position coordinate values) immediately whenever the deformation touch signal is input from the touch signal processing section 100. After this, (for example, in 15 ms), when the contact touch signal is input from the touch signal processing section 100, the latch processing circuit 240 outputs the current position coordinate values last latched based on the deformation touch signal to the computer 250 as the detected coordinate values by the touch signal probe 10.

The computer 250 outputs a gain signal, a threshold level signal, and a reseat position correction signal to the touch signal processing section 100 as required for performing control switching of the touch signal probe 10. Next, a flow of signal processing of the touch signal probe 10 according to the invention in the program-controlled CMM will be discussed with reference to FIG. 5.

The signal processing is started at step 10 (S10). First, at step 20 (S20), a work W is placed on the stage of the CMM. Next, at step S30 (S30), the axes of the CMM are returned to the origin. Again signal (low gain), a threshold level signal, and a reseat position correction signal are output to the touch signal processing section 100 through which the touch signal probe 10 is initialized. Further display means and input means of the computer 250 (not shown) are used to select a measurement program previously stored in storage means (not shown). At step 40 (S40), one instruction of the measurement program is read and the contents of the instruction are analyzed. Next, at step 50 (S50), whether or not the instruction is a measurement instruction is determined. If the instruction is a measurement instruction, control goes to step 60 (S60). If the instruction is not a measurement instruction (for example, is a lighting instruction, etc.,), the instruction is executed at a step (not shown) and again control returns to step 40 (S40).

At step 60 (S60), the contents of the measurement instruction (measurement type, measurement coordinate values, etc.,) are analyzed and the touch signal probe 10 is positioned at the position 3 mm before the measurement point. Upon completion of the positioning, at step 70 (S70), a reseat position correction signal is output for correcting the reseat position of the stylus. At step 80 (S80), a gain signal (high gain) is output, thereby enhancing the sensitivity. At the point in time, temporary storage area for storing the current coordinate values of the axes at step 110 (S110) is all cleared.

Then, at step 90 (S90), the touch signal probe 10 is moved toward the measurement point of the work W at low speed. The move target point at this time is set to the work side about 1 mm from the measurement point to ensure that the contact element 24 of the touch signal probe 10 is brought into contact with (collided against) the work W. Next, at step 100 (S100), whether or not a deformation touch signal is input is determined. If the signal of the deformation touch signal is input, control goes to step 110 (S110) and the current coordinate values of the axes are read from the X, Y, and Z axis counters 211 to 213 and are temporarily stored. To temporarily store the current coordinate values of the axes, whenever whether or not a deformation touch signal is input is determined at step 100 (S100), the old data of the current coordinate values of the axes is overwritten with new in the same area, so that the most recent data is always held. On the other hand, if no deformation touch signal is input, control goes to step 120 (S120).

At step 120 (S120), whether or not a contact touch signal is input is determined. If the signal is not input, control is returned to step 100 (S100). If the signal is input, control goes to step 130 (S130) and the current coordinate values of the axes last stored at step 110 (S110), namely, the most recent current coordinate values of the axes are internally stored as the detected coordinate values. The detected coordinate values are displayed on the display means of the computer 250 (not shown) and are output to output means (not shown), such as a printer, as required. At the point in time, the touch signal probe 10 continues to feed. At step 140 (S140), a gain signal (low gain) is output for preventing later erroneous input of deformation touch signal (the sensitivity is lowered accordingly).

At step 150 (S150), the axes are stopped with deceleration. At the point in time, the contact element 24 of the touch signal probe 10 is pushed into the work about 400 μm and the make-and-break contacts of the reseat position system are broken reliably. Then, at step 160 (S160), the touch signal probe 10 is returned to a reference point (for example, the midpoint between the CMM and the work). At step 170 (S170), whether all instructions of the measurement program have been executed is determined. If not all instructions have been executed, control returns to step 40 (S40) and another instruction is analyzed and executed. If all instructions have been executed, control goes to step 180 (S180) and the measurement processing is terminated.

Although not shown in the figure, if no contact touch signal does not appear although the move target point specified at step 90 (S90) is not reached or if a deformation touch signal is input while a gain signal (low gain) is output, an anomaly such that the probe does not come in contact with the work W because of a shape anomaly of the work W or that the probe collides with the work W while the probe is moved at high speed is possible and thus emergency stop of the CMM is conducted. If the contact touch signal is input before the deformation touch signal is input during measurement move at step 90 (S90), an inappropriate measurement condition such that the work W is a soft material, for example, is possible. In this case, the operator can select any of the following options 1) to 5).

1) stopping of measurement,
2) re-measurement (recovery),
3) speeding up measurement and re-measurement,
4) lowering the threshold level in comparison circuit 171 and re-measurement, or
5) raising the gain of the amplification circuit 161 and re-measurement.

Here, in 3) to 5), the deformation touch signal easily appears.

As the described processing is performed, the coordinate values of each measurement point are internally stored as the detected coordinate values and thus shape analysis, etc., can be conducted based on the data.

The embodiment can provide the following advantages:
(1) The current coordinate values of the axes are latched by the deformation touch signal generated from the deformation detection element. Then when the contact touch signal generated from the make-and-break contacts of the reseat position system is input, the most recent current coordinate values of the axes latched are adopted as the detected coordinate values. Thus if the deformation touch signal is output due to noise, the reliable detected coordinate values can be provided.
(2) For deformation detection element output, the frequency component most containing noise is shut off through the high-pass and low-pass filters, so that the deformation touch signal can be provided reliably.
(3) Since the amplification circuit 161 is provided with gain switching in the process of deformation touch signal generation, emergency stop caused by erroneous input of the deformation touch signal in non-measurement mode can be prevented.
(4) Since any desired threshold level is input to the comparison circuit 171 in the process of deformation touch signal generation, emergency stop caused by erroneous input of the deformation touch signal in non-measurement mode can be prevented.
(5) The touch signal processing section 100 is provided with gain switching of the amplification circuit 161, input of any desired threshold level to the comparison circuit 171, and reseat position correction input, which are automatically controlled, so that a reliable deformation touch signal can be provided easily.
(6) Since input of any desired threshold level to the comparison circuit 171 is provided in the process of deformation touch signal generation, the deformation touch signal can be output reliably even if the work is a soft material.
(7) At each reseating after contact between the contact element 24 and the work W, displacement operation is applied to the arm 12 by the piezoelectric element 14. Thus, relative displacement occurs between the hard ball 13 and the post 23 and the frictional directions between the hard balls 13 and the posts 23 are made uniform. Thus, the contact point is reseated at the most stable position, the reseat position shift error is lessened, and the reseat position restoration accuracy is enhanced. To make the frictional directions uniform, the displacement directions need not necessarily be one direction and enlargement and shrinkage directions may be alternated.
(8) The arm 12 is formed of beryllium copper. Thus, if displacement is given by the piezoelectric element 14, heating can be lessened and degradation caused by metal fatigue can be prevented for prolonging the life.
(9) The elastic thin piece is pressed against the hard ball 13 to make electric connection. Thus, if the hard ball 13 is displaced by the piezoelectric element 14, a failure of a lead break for electric connection, etc., can be provided.
(10) To use a helical spring as the bias means 71, the coil diameter is set in the range of 5% to 20% of the kinematic circle formed by the contact points between the hard balls 13 and the posts 23 of the reseat position points. Thus, are seat position error caused by the effect of the rotation moment accompanying compression of the helical spring can be circumvented.
(11) To use a helical spring as the bias means 71, the ratio of the length of the helical spring to the coil diameter is placed in the range of 1 to 2.5. Thus, the stability in the bias direction can be provided while the effect of the rotation moment accompanying compression of the helical spring is circumvented.
(12) Since the shaft of the helical spring is matched with the barycentric point of the movable member 21 for biasing, stable bias can be performed.
(13) Further, the barycentric point of the movable member 21 is matched with the center of the kinematic circuit, whereby more stable bias can be performed.
(14) The reseat position member is made up of post and ball. Thus, high-accuracy machining can be easily performed and the reseat position error is lessened.

Figure 6:
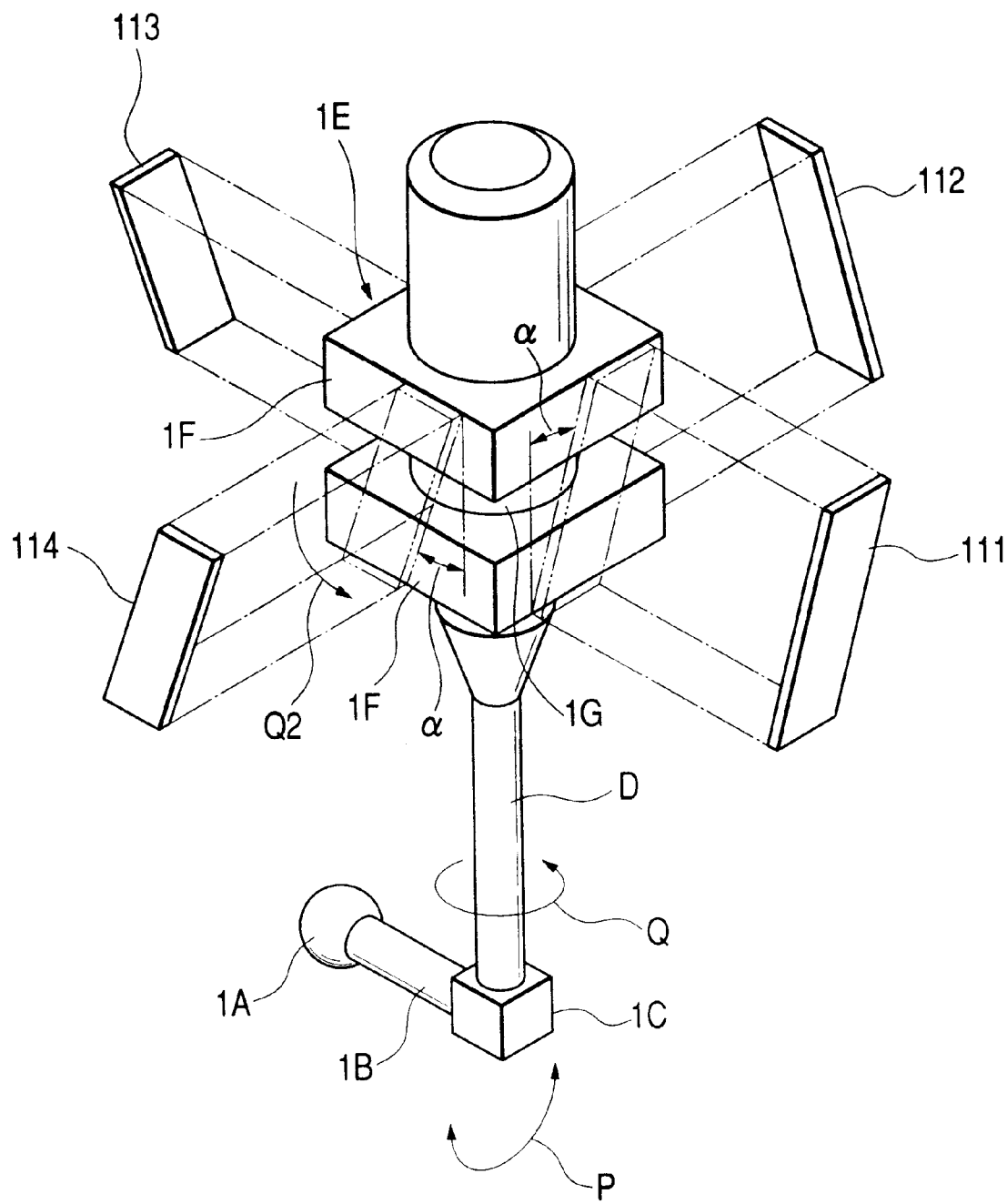
FIG. 6 shows a modification of stylus.

In addition to the described embodiment, various modifications of the invention are possible. For example, the contact element 24 is placed on the axis of the stylus 22 in FIGS. 9A and 9B, but may be placed as shown in FIG. 6. In FIG. 6, displacement detection elements may be piezoelectric elements 111, 112, 113, and 114. A pair of piezoelectric elements 111 and 113 opposed to each other is placed on a detection element support part 1E so as to become symmetrical with respect to a stylus axis. A pair of piezoelectric elements 112 and 114 is placed on a detection element support part 1F so as to become symmetrical with respect to the stylus axis. The piezoelectric elements 111, 112, 113, and 114 have the same shape.

The piezoelectric elements 111, 112, 113, and 114 are inclined by angle $\alpha$ relative to the axis of a stylus D symmetrically with respect to the axis for attachment. The force of twist (bend direction P) of the stylus D is transmitted along roughly the length direction of each piezoelectric element, so that change in the state amount can be detected sufficiently. As for the stylus of this structure, the deformation detection elements are inclined by the angle $\alpha$ relative to the axis of the stylus D symmetrically with respect to the axis for attachment as compared with the stylus shown in FIGS. 9A and 9B. Thus, since the sensitivity to the twist of the stylus D is enhanced, a probe of a structure wherein a contact element does not exist on the axis of the stylus can be provided and the applicability of touch signal probe measurement is enhanced.

Figure 7A:
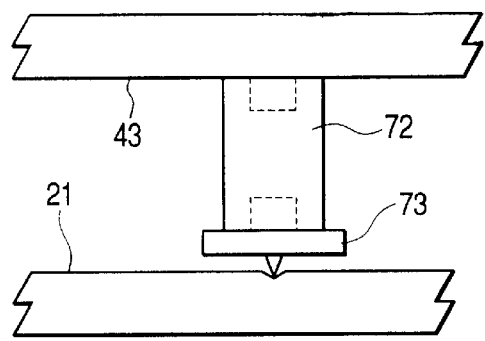
FIGS. 7A to 7D show modifications of bias means.
Figure 7B:
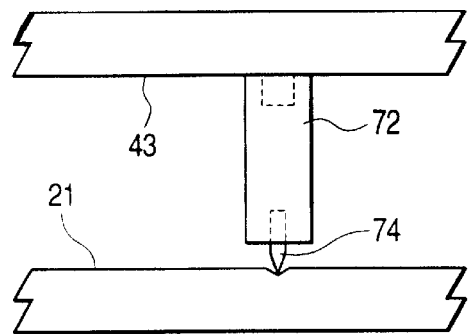
Figure 7C:
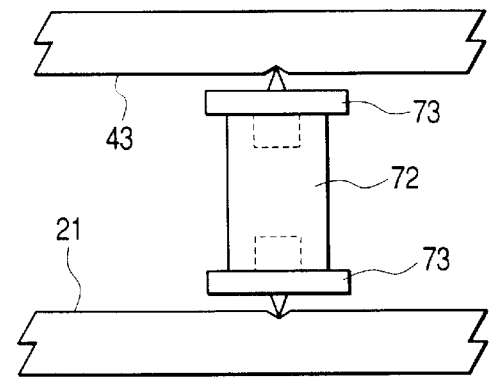

Modifications of the bias means 71 in FIG. 1 are possible as shown in FIGS. 7A–7D. In FIG. 7A, the upper end of a helical compression spring 72 is fixed to a ceiling 43 of a housing 41. An end plate 73 is attached to the lower end of the spring 72. A conical pin projects at the lower part of the end plate 73. A conical recess is made at the barycentric position of a movable member 21 and the conical pin is abutted against the conical recess for biasing. In FIG. 7B, in the structure in FIG. 7A, a conical rod 74 in place of the end plate 73 is fixed to the lower end of the helical compression spring 72. The conical tip of the conical rod 74 is abutted against the conical recess of the movable member 21 for biasing. In FIG. 7C, in the structure in FIG. 7A, end plates 73 are fixed to both ends of the helical compression spring 72. A conical recess is made at the barycentric position of the movable member 21 and the ceiling 43 of the housing 41 corresponding to the barycentric position. Conical pins of end plates 73 are abutted against the conical recesses for biasing.

Figure 7D:
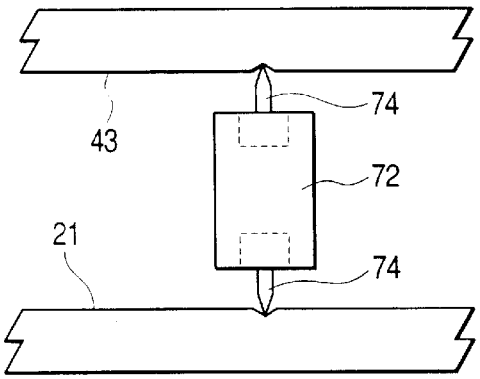
Figure 8:
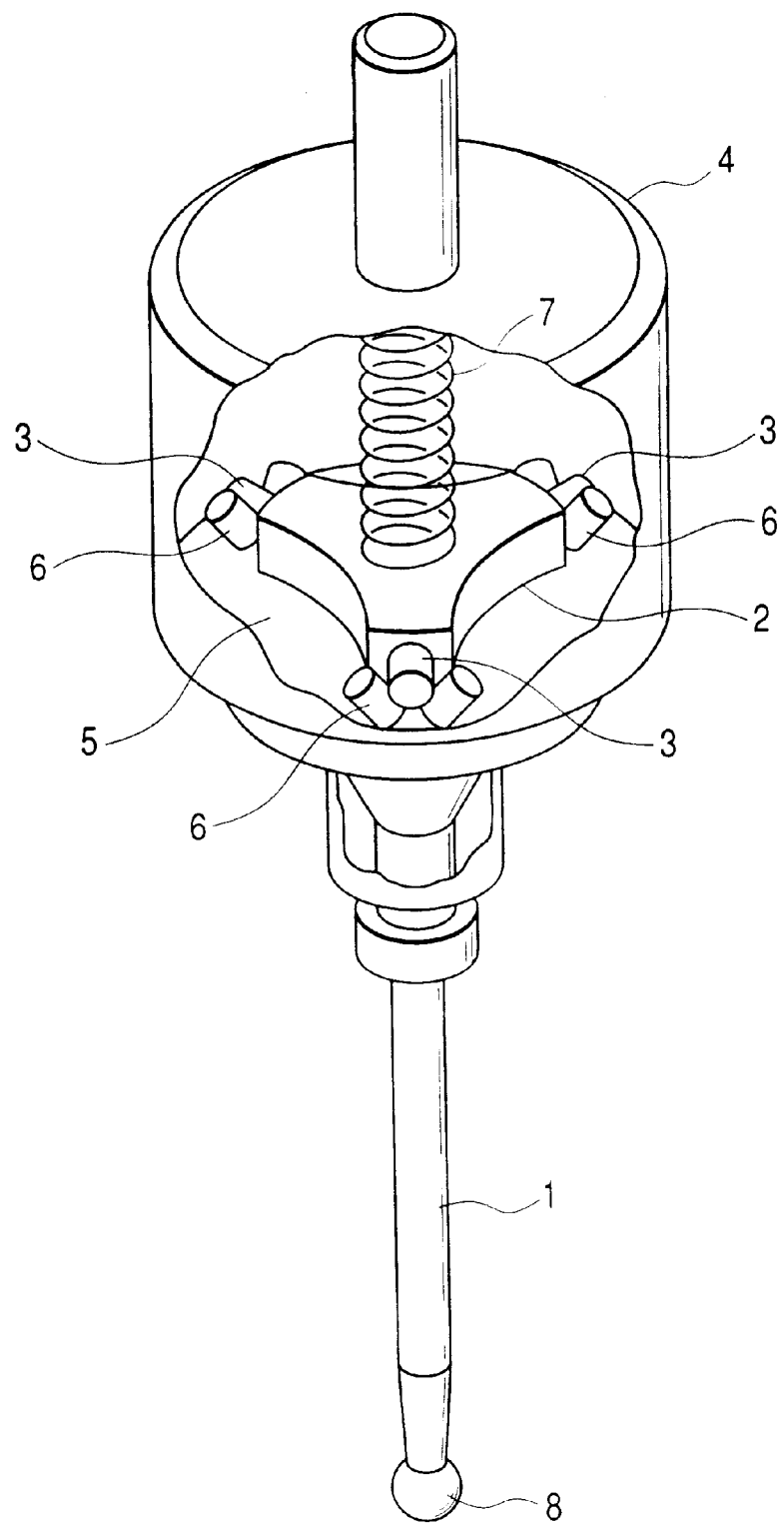
FIG. 8 is a drawing to show the structure of a touch signal probe in a related art.

In FIG. 7D, in the structure in FIG. 7B, conical rods 74 are fixed to both ends of the helical compression spring 72. Conical recesses are made at the barycentric position of the movable member 21 and the ceiling 43 of the housing 41 corresponding to the barycentric position. The conical tips of the conical rods 74 are abutted against the conical recesses for biasing. In the modifications of the bias means, in the structures in FIGS. 7A to 7D, the effect of the rotation moment accompanying compression of the helical compression spring is scarcely received. Thus, the restrictions on the coil diameter are eliminated, the flexibility of the design is enhanced, the reseat position shift error is lessened, and the reseat position restoration accuracy is enhanced. The gain switching signal in the circuit 161 in FIG. 3 in the embodiment is a switching signal for switching between high and low gains, but the amplification factor itself may be input for setting the specified gain. Further the gain switching for this purpose may be performed separately in the circuits 131 to 134.

In addition to switching the gain in the circuit 161 for the purpose of noise removal, the threshold level in the circuit 171 may be changed for removing noise. Further, the threshold level in the circuit 171 may be an internal semi-fixed value of the touch signal processing section without being input from the outside. According to the circuit configurations, lowering the sensitivity for noise removal in non-measurement mode and sensitivity enhancement for measuring a work of a soft material can be accomplished by setting any desired gain in the amplification circuit 161 or setting any desired threshold level in the comparison circuit 171. Thus, the deformation touch signal can be provided reliably and the reliability of measurement with the touch signal probe 10 is enhanced.

In the embodiment, if gain adjustment is made separately in response to variations in performance of a plurality of relative displacement means (piezoelectric elements 14) rather than simultaneous supplying the displacement drive voltage generated in the circuit 191 in FIG. 3 to the plurality of relative displacement means, the arms can be made uniform in performance. Further, the displacement drive voltage for slowly displacing the reseat position system on the fixed member side may be supplied to the three piezoelectric elements 14 with a time difference rather than be supplied to the piezoelectric elements 14 at the same time. Accordingly, harmful vibration of the movable member can be easily suppressed. The time width of the monostable multivibrator in the embodiment is set to about 100 ms, but may be set to an optimum value depending on the measurement speed in the CMM, the length of the stylus of the touch signal probe, or the noise condition.

Figure 5:
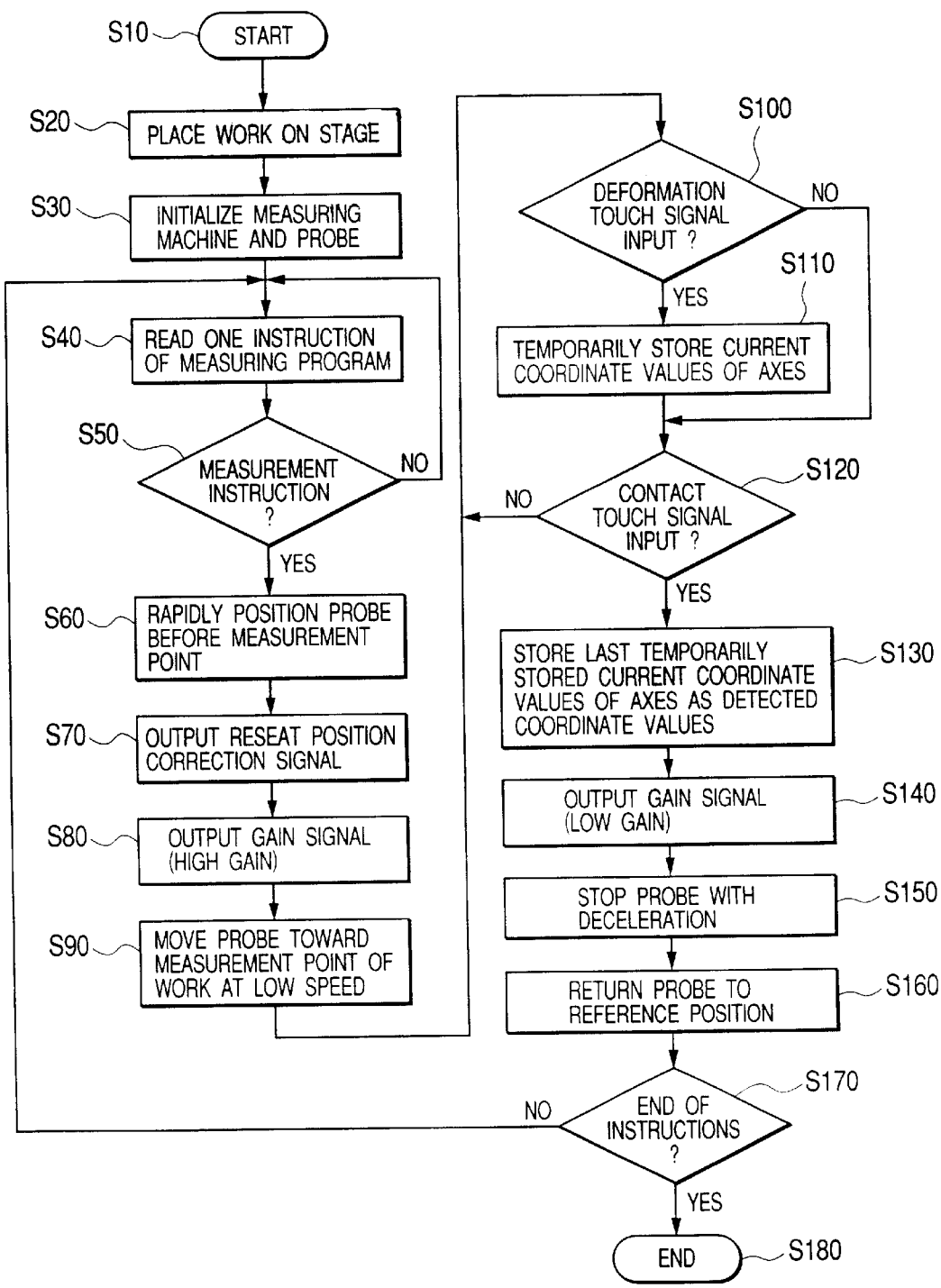
FIG. 5 is a flowchart of signal processing of the touch signal probe according to the invention.

Further, in FIG. 5, the deformation touch signal and the contact touch signal are monitored separately, but the determination at step 120 in FIG. 5 may be made based on the ANDing result of both the signals. According to this method, the detected coordinate values can be provided more reliably. Displacement of the reseat position contact point by the reseat position correction signal may be made from one displacement limit to another every reseat position correction signal. Displacement of the reseat position contact point by the reseat position correction signal may be returned to the one displacement limit after it is made from one displacement limit to another every reseat position correction signal. Likewise, it may be reciprocated between one displacement limit and another.

Further, FIG. 5 shows the signal processing flow of the touch signal probe for executing the already prepared measurement program in the program-controlled CMM. However, the gain, threshold level, and reseat position correction signals may also be fed into the touch signal processing section 100 whenever necessary for automatically controlling the touch signal probe 10 in semi-automatic measurement for entering measurement point coordinate values from the input means of a computer and measuring the coordinate values of one point (corresponding to MDI (manual data input) in NC) and manual measurement for holding and moving a probe and conducting measurement. For example, in the semi-automatic measurement, if a start button is pressed after the measurement point coordinate values are entered, steps 60 to 150 (or 160) in FIG. 5 may be executed after the probe is initialized.

In the manual measurement, the current coordinate values of the X, Y, and Z axis counters 211 to 213 are monitored at all times (for example, every 10 ms) and the move speed of each axis is found from the difference between the preceding current coordinate values and the present current coordinate values is found and if the combined speed of the axes is given speed or more, a gain signal (low gain) and a threshold level signal (high level) are output to the touch signal processing section 100; if the combined speed is less than the given speed or more, a gain signal (high gain) and a threshold level signal (low level) are output. Further, state change from moving to stopping is detected and a reseat position correction signal is output. In doing so, even in the semi-automatic measurement or the manual measurement, the touch signal probe is controlled automatically, so that a deformation touch signal can be provided reliably, measurement is facilitated, and the reliability of measurement is enhanced.

As described above, according to the signal processing apparatus and the signal processing method of the touch signal probe of the invention, various types of noise removal operation are applied to a deformation touch signal generated as deformation of the stylus is detected. A contact touch signal generated from the make-and-break contacts consisting of the reseat position elements is used as a check signal. Thus, the deformation touch signal can be provided reliably, measurement is facilitated, and the reliability of measurement is enhanced.

What is claimed is:

1. A signal processing apparatus of a touch signal probe used for a machine capable of measuring coordinate values of the touch signal probe, the touch signal probe having a fixed member, a movable member to which a stylus comprising a contact element and a deformation detection element is attached, a fixed member side reseat position element being placed on the fixed member, a movable member side reseat position element being placed on the movable member for coming in contact with the fixed member side reseat position element, and a bias member for allowing displacement of the movable member relative to the fixed member when an external force acts on the stylus and restoring the movable member to a still position by a bias force when the external force acting on the stylus disappears, said signal processing apparatus comprising:

a drive circuit for outputting a drive signal for causing the movable member side reseat position element to make a relative move to the fixed member side reseat position element;

a deformation touch signal processing circuit for generating a deformation touch signal from the deformation detection element;

a contact touch signal processing circuit using the fixed member side and movable member side reseat position elements as make-and-break electric contacts to generate a contact touch signal from the make-and-break electric contacts; and a latch circuit for inputting the coordinate values every instant at which the deformation touch signal is output and storing the coordinate values as the most recent coordinate values for update and when the contact touch signal is output, outputting the most recent coordinate values as detected coordinate values.

2. The signal processing apparatus of the touch signal probe as claimed in claim 1, wherein the deformation touch signal processing circuit includes a high-pass filter circuit and a low-pass filter circuit.

3. The signal processing apparatus of the touch signal probe as claimed in claim 2, wherein the high-pass filter circuit has a cutoff frequency ranging from 3 kHz to 10 kHz.

4. The signal processing apparatus of the touch signal probe as claimed in claim 2, wherein the low-pass filter circuit has a cutoff frequency ranging from 50 kHz to 200 kHz.

5. The signal processing apparatus of the touch signal probe as claimed in claim 1, wherein the deformation touch signal processing circuit includes an amplification circuit wherein gain switching is possible.

6. The signal processing apparatus of the touch signal probe as claimed in claim 5, wherein the amplification circuit switches the gain by a gain signal provided from the machine.

7. The signal processing apparatus of the touch signal probe as claimed in claim 1, wherein the deformation touch signal processing circuit includes a comparison circuit.

8. The signal processing apparatus of the touch signal probe as claimed in claim 7, wherein the deformation touch signal processing circuit includes a monostable multivibrator started by output of the comparison circuit and converts a high-frequency signal output from the deformation detection element by the monostable multivibrator into a digital low-frequency signal.

9. The signal processing apparatus of the touch signal probe as claimed in claim 7, wherein the comparison circuit switches a threshold level by a threshold level signal provided from the machine.

10. The signal processing apparatus of the touch signal probe as claimed in claim 1, wherein the drive circuit causes the movable member side reseat position element to make a relative move to the fixed member side reseat position element on the basis of a reseat position correcting signal provided from the machine.

11. A touch signal probe comprising:
   a fixed member;
   a movable member to which a stylus comprising a contact element and a deformation detection element is attached;
   a fixed member side reseat position element being placed on the fixed member;
   a movable member side reseat position element being placed on the movable member for coming in contact with the fixed member side reseat position element;
   A bias member for allowing displacement of the movable member relative to the fixed member when an external force acts on the stylus and restoring the movable member to a still position by a bias force when the external force acting on the stylus disappears:
   a drive member for causing the movable member side reseat position element to make a relative move to the fixed member side reseat position element;
   a deformation touch signal processing circuit for generating a deformation touch signal from the deformation detection element;
   a contact touch signal processing circuit using the fixed member side and movable member side reseat position elements as make-and-break electric contacts to generate a contact touch signal from the make-and-break electric contacts; and
   a signal processing unit having a latch circuit for inputting coordinate values of the touch signal probe every instant at which the deformation touch signal is output and storing the coordinate values as the most recent coordinate values for update and when the contact touch signal is output, outputting the most recent coordinate values as detected coordinate values.

12. The touch signal probe as claimed in claim 11, wherein the movable member side reseat position element comes in contact with the fixed member side reseat position element at each contact point with two at three apart places from each other.

13. The touch signal probe as claimed in claim 12, wherein the drive member is a contact point displacement member for changing the contact point on the fixed member side and the contact point on the movable member side relatively at least a predetermined distance.

14. The touch signal probe as claimed in claim 12, wherein the drive member causes relative vibration only for a given time while holding contact between the contact points on the fixed member side and the movable member side after the external force acting on the movable member disappears.

15. The touch signal probe as claimed in claim 11, wherein a diameter of the bias area containing a point biasing the movable member by the bias member is 20% or less of a diameter of a kinematic circle containing the contact points on the circumference with the axis of the stylus as the center and is roughly equal to or more than a pinpoint.

16. The touch signal probe as claimed in claim 15, wherein a center of the bias area roughly matches a barycentric position of the movable member.

17. The touch signal probe as claimed in claim 15, wherein a center of the bias area roughly matches a center of the kinematic circle.

18. The touch signal probe as claimed in claim 15, wherein the bias member includes a helical spring and a length of the helical spring is about one time or more and 2.5 times or less a diameter of the helical spring.

19. A signal processing method of a touch signal probe for use with a machine capable of measuring coordinate values of said touch signal probe, the touch signal probe having a fixed member, a movable member to which a stylus comprising a contact element and a deformation detection element is attached, a fixed member side reseat position element being placed on the fixed member, and a movable member side reseat position element being placed on the movable member for coming in contact with the fixed member side reseat position element, a drive member for causing the movable member side reseat position element to make a relative move to the fixed member side reseat position element, an bias member for allowing displacement of the movable member relative to the fixed member when an external force acts on the stylus and restoring the movable member to a still position by a bias force when the external force acting on the stylus disappears, a deformation touch signal processing circuit including an operation circuit for enabling an operation condition to be switched, for generating a deformation touch signal from the deformation detection element, and a contact touch signal processing circuit using the fixed member side and movable member side reseat position elements as make-and-break electric contacts to generate a contact touch signal from the make-and-break electric contacts, said signal processing method comprising:
   positioning the touch signal probe before a measurement point of a work;
   driving the drive member for making a reseat position correction;

switching the operation condition of the operational circuit for enhancing sensitivity;

feeding the touch signal probe into the measurement point for measuring;

when the deformation touch signal is input, inputting the coordinate values and storing the coordinate values as the most recent coordinate values for update;

when the contact touch signal is input, outputting the most recent coordinate values as detected coordinate values; and switching the operation condition of the operational circuit for lowering the sensitivity.

* * * * *